(12) United States Patent
Garcia et al.

(10) Patent No.: US 9,146,562 B2
(45) Date of Patent: Sep. 29, 2015

(54) ADJUSTABLE DOSER VALVE

(71) Applicant: G.W. Lisk Company, Inc., Clifton Springs, NY (US)

(72) Inventors: Gary Garcia, Easton, MD (US); Jeff Tyler, Newark, NY (US); Bill Crane, Palmyra, NY (US); Rob Gardner, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 70 days.

(21) Appl. No.: 13/936,412

(22) Filed: Jul. 8, 2013

(65) Prior Publication Data

US 2013/0312836 A1  Nov. 28, 2013

Related U.S. Application Data

(62) Division of application No. 13/063,770, filed as application No. PCT/US2009/062315 on Oct. 28, 2009, now abandoned.

(60) Provisional application No. 61/109,231, filed on Oct. 29, 2008.

(51) Int. Cl.
*F02M 65/00* (2006.01)
*G05D 7/06* (2006.01)
*F16K 1/34* (2006.01)
(Continued)

(52) U.S. Cl.
CPC .............. *G05D 7/0617* (2013.01); *F16K 1/34* (2013.01); *F16K 31/0651* (2013.01); *F16K 49/005* (2013.01); *F02M 65/001* (2013.01); *F02M 2200/505* (2013.01); *Y10T 137/0318* (2015.04); *Y10T 137/0368* (2015.04); *Y10T 137/0379* (2015.04); *Y10T 137/0491* (2015.04)

(58) Field of Classification Search
CPC .................. F02M 2200/505; F02M 2200/507; F02M 2200/8092; F02M 65/00–65/005; G05D 7/0617; F16K 1/34; F16K 49/005; F16K 31/0651; Y10T 137/0491; Y10T 137/0368; Y10T 137/0318; Y10T 137/0379
USPC ................ 137/129.18, 129.21, 10, 12, 15.18; 251/285, 129.18, 129.21
See application file for complete search history.

(56) References Cited

U.S. PATENT DOCUMENTS

| 3,477,648 | A |   | 11/1969 | Roosa |
| 4,163,521 | A |   | 8/1979 | Roosa |
| 4,176,822 | A | * | 12/1979 | Chadwick ................ 251/129.06 |

(Continued)

FOREIGN PATENT DOCUMENTS

| JP | 61-11453 A | 1/1986 |
| JP | 08189439 A | 7/1996 |

(Continued)

OTHER PUBLICATIONS

International Search Report dated Mar. 3, 2010 for PCT/US2009/062315.

*Primary Examiner* — William McCalister
(74) *Attorney, Agent, or Firm* — Brown & Michaels, PC (57) ABSTRACT

A doser valve with a seat comprising at least one axially located slot from an outer surface of the seat and at least one radial/tangential extending passage in fluid communication with the at least one axially located slot and an exit passage out of the seat.

4 Claims, 10 Drawing Sheets

(51) Int. Cl.
*F16K 31/06* (2006.01)
*F16K 49/00* (2006.01)

(56) References Cited

U.S. PATENT DOCUMENTS

| | | | |
|---|---|---|---|
| 4,342,443 A * | 8/1982 | Wakeman | 251/129.08 |
| 4,508,091 A * | 4/1985 | Wakeman | 123/586 |
| 4,892,070 A | 1/1990 | Kuhnert | |
| 5,221,046 A | 6/1993 | Timmer | |
| 5,769,119 A | 6/1998 | Edenfield | |
| 5,894,991 A | 4/1999 | Edwards et al. | |
| 6,484,700 B1 | 11/2002 | Kimmel et al. | |
| 6,994,312 B2 * | 2/2006 | Pauer et al. | 251/129.18 |
| 7,093,769 B2 * | 8/2006 | Toiyama | 239/5 |
| 7,150,443 B2 * | 12/2006 | Mills | 251/63.5 |
| 2003/0178593 A1 * | 9/2003 | Grytz | 251/129.16 |
| 2008/0023578 A1 * | 1/2008 | Grandi | 239/533.2 |

FOREIGN PATENT DOCUMENTS

| | | |
|---|---|---|
| JP | 2002-013455 A | 1/2002 |
| JP | 2002130071 A | 5/2002 |
| JP | 2005155468 A | 6/2005 |
| JP | 2006002780 A | 1/2006 |
| JP | 2006002632 A | 5/2006 |
| JP | 2008-032005 A | 2/2008 |

* cited by examiner

ADJUSTABLE DOSER VALVE

REFERENCE TO RELATED APPLICATIONS

This is a divisional application of copending application Ser. No. 13/063,770, filed Mar. 14, 2011, entitled, "ADJUSTABLE DOSER VALVE", which is a U.S. National Stage under 35 U.S.C. 371 of PCT/US09/062315, filed Oct. 28, 2009, entitled "ADJUSTABLE DOSER VALVE", which claims one or more inventions which were disclosed in Provisional Application No. 61/109,231, filed Oct. 29, 2008, entitled "ADJUSTABLE DOSER VALVE". The benefit under 35 USC §119(e) of the United States provisional application is hereby claimed, and the aforementioned applications are hereby incorporated herein by reference.

BACKGROUND OF THE INVENTION

1. Field of the Invention

The invention pertains to the field of valves. More particularly, the invention pertains to adjustable doser valves.

2. Description of Related Art

Doser valves have been used in diesel engines to deliver small shot of atomized fuel into the exhaust stream to incinerate deposits that collect and build up in the exhaust filter. The shots of atomized fuel aid in cleaning out the filters so that they function properly.

Figure 5:
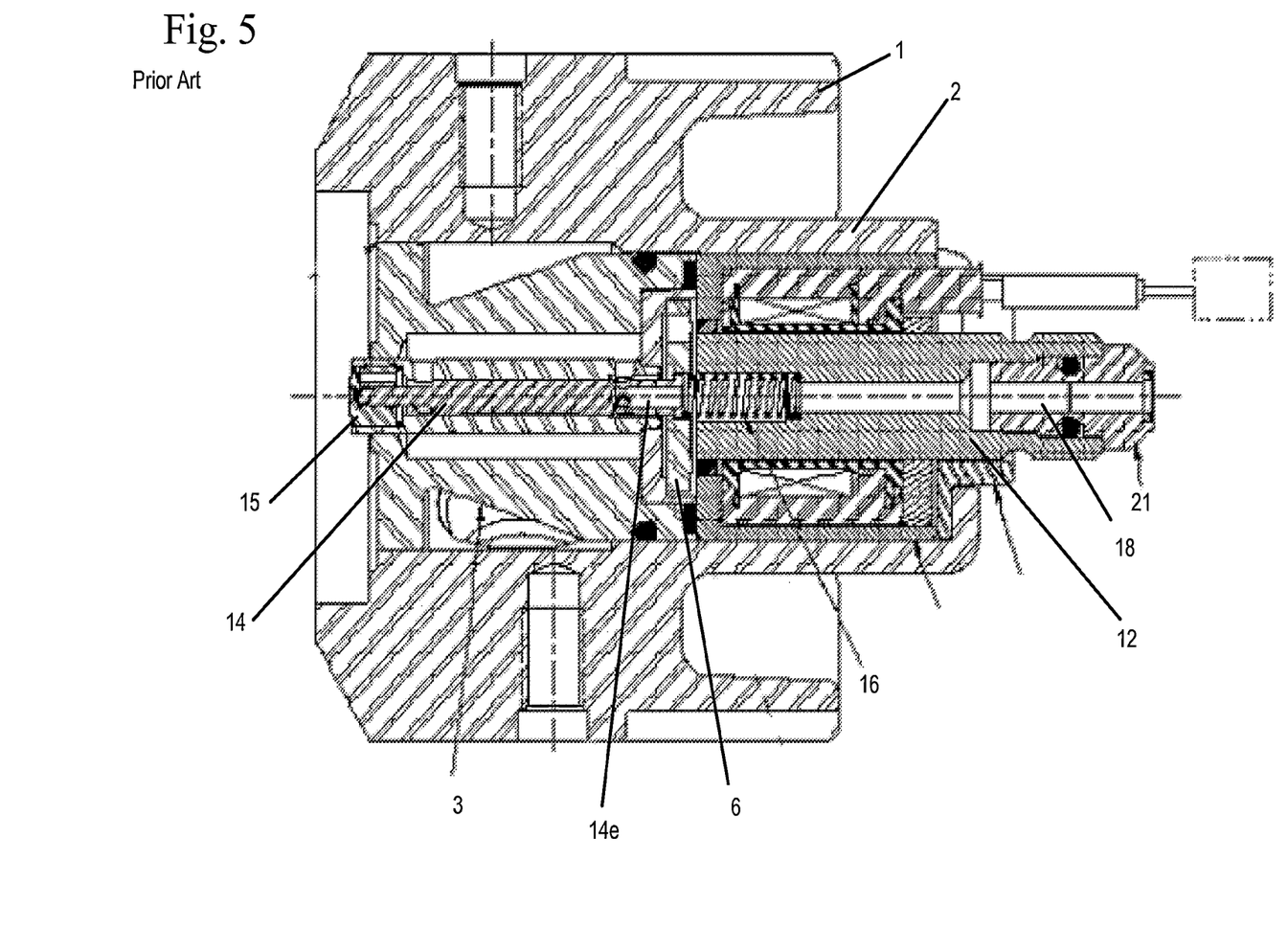
FIG. 5 shows a cross-section of a prior art doser valve.
Figure 6A:
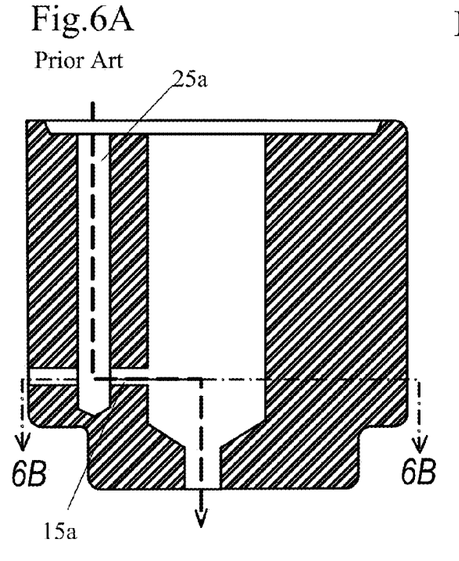
FIG. 6A shows a section of a prior art doser valve seat.
Figure 6B:
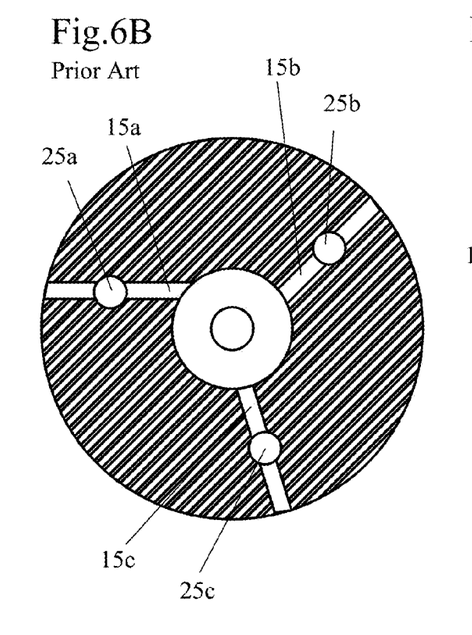
FIG. 6B a cross-section of the prior art doser valve seat of FIG. 6A.

FIGS. 5, 6A, and 6B show a prior art doser valve. Referring to FIG. 5 the prior art doser valve receives pressurized fuel from a source through a fuel inlet connection point 21, which delivers fuel to a passageway 18 of an armature 6. From the passageway 18 of the armature 6, fuel flows to a passageway 14e in the poppet 14 received within a cartridge body 3. From the passageway 14e, fuel flows through axially drilled passages 25 and holes 15a and in the seat 15 and exits the prior art doser valve when the poppet head 14 is not sealingly engaged with the seat 15. The poppet 14 is lifted by the armature 6. When the solenoid assembly 2 is energized, magnetic forces attract the armature 6 to the stop 12 and overcome the force of the spring 16, and lift it away from the seat 15. Because the poppet 14 is lifted by the armature 6, the conical end of the poppet 14 will lift off of the seat 15 when the armature 6 is actuated, so that a metered quantity of fuel is expressed from the conical end of the poppet 14.

In conventional doser valves, the stop 12 is set to a preset stroke distance and remains immovable for the life of the valve.

DETAILED DESCRIPTION OF THE INVENTION

FIGS. 1-4 illustrate a doser valve of an embodiment of the present invention. FIGS. 6A, 6B, 7A, and 7B compare features of the doser valve of the prior art to the doser valve of the present invention.

Referring to FIGS. 1-4, 7A, and 7B, the doser valve 100 of the present invention includes a solenoid assembly 102 including at least one coil connected to a power source, a bobbin, and an armature 112, a valve assembly 104 including a poppet and a seat 115, and a stop 106 received within a doser valve housing 101.

Figure 1:
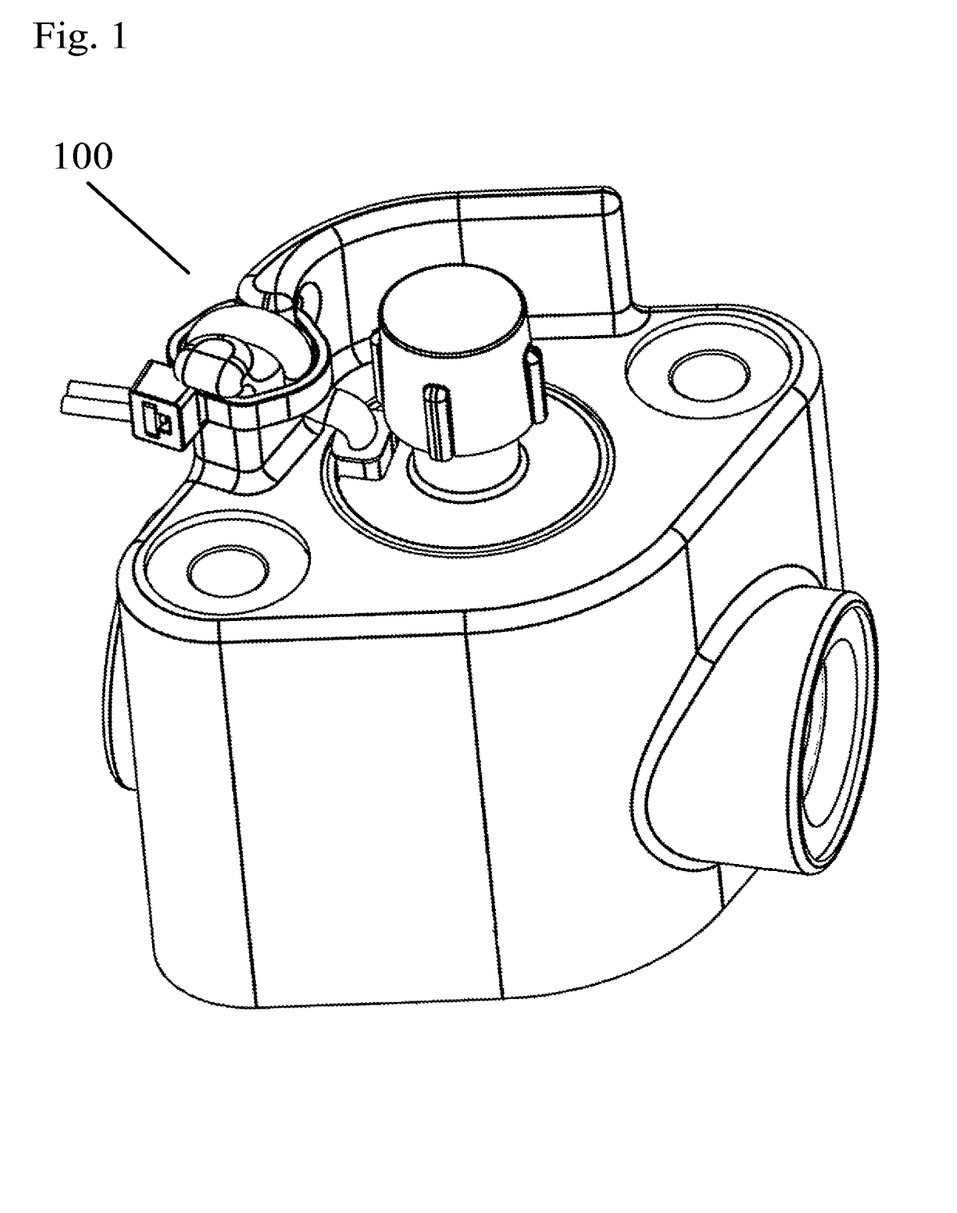
FIG. 1 shows the doser valve of the present invention.
Figure 2:
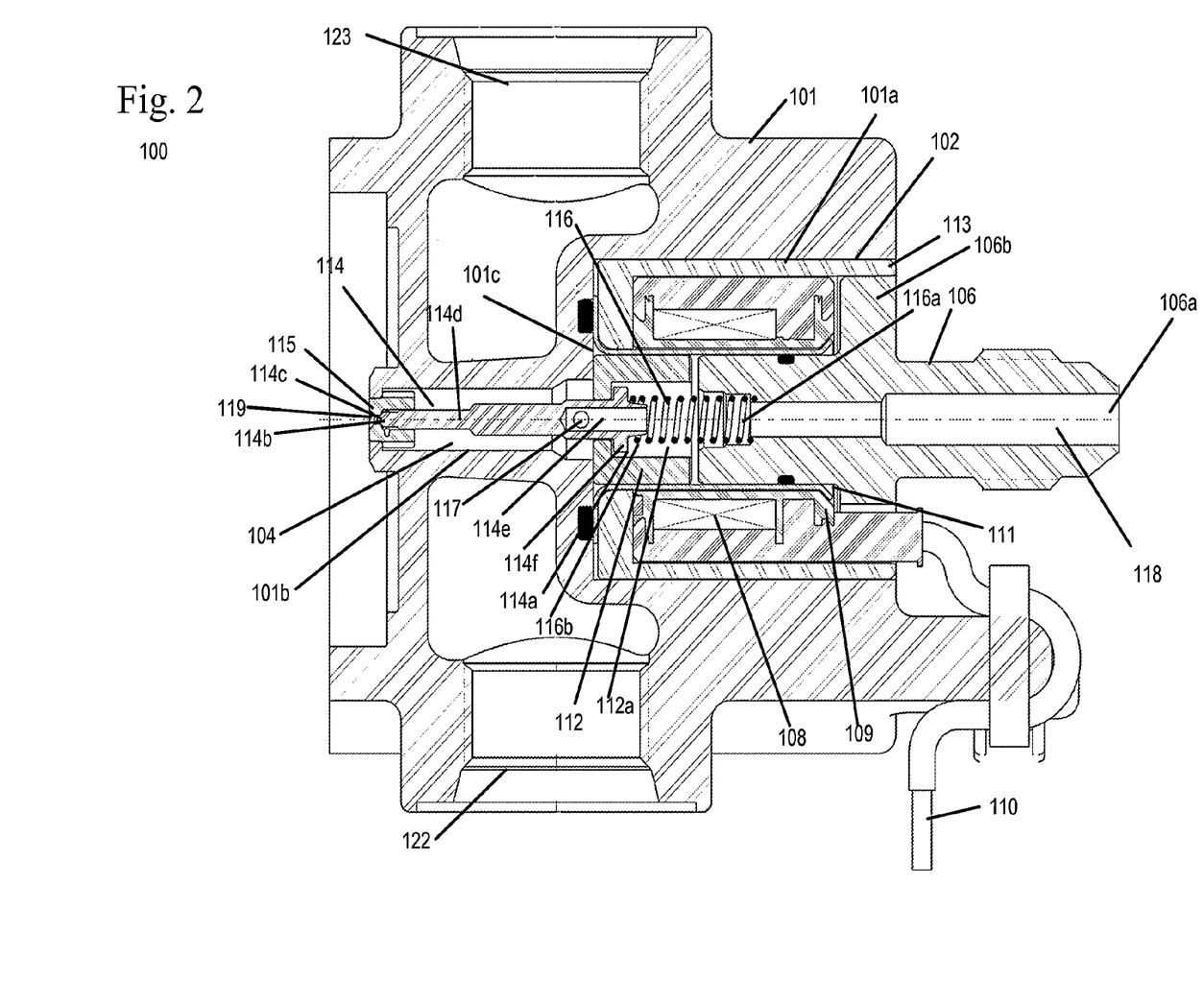
FIG. 2 shows a cross-section of the doser valve of the present invention.
Figure 3:
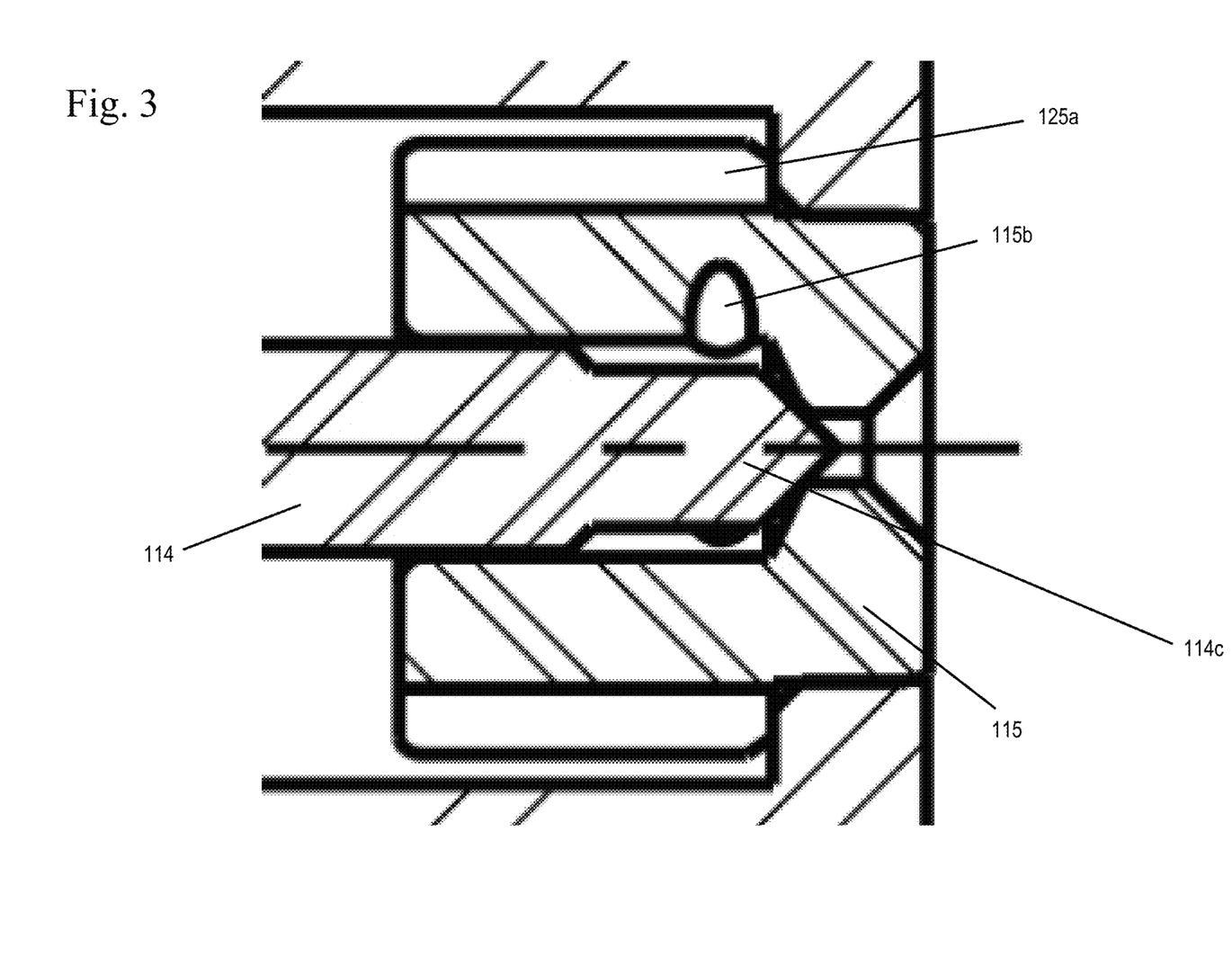
FIG. 3 shows a magnified view of the seat of the doser valve of the present invention.

The doser valve housing 101 defines a first bore 101a for receiving the solenoid assembly 102 with a first open end and a second end defined by an inner wall 101c with a smaller opening graduating to a second bore 101b for receiving the valve assembly 104. The doser valve housing also defines a passage with a coolant inlet 122 and outlet 123 (orientation non-specific) that allow a constant flow of coolant to continuously extract heat away from the valve and the second bore 101b, breaking the heat path to the solenoid assembly 102 and eliminating the need for an external heat shield.

The first bore 101a of the doser valve housing 101 receives a tubular casing 113 that surrounds at least one coil of conductive material 108 wrapped around a tubular bobbin 109 and electrically coupled to and energized by an electric or power source 110. The core tube further defines a through hole 111 in which an armature 112 is received and electromagnetically actuated.

Also present within the through hole 111 is a stop 106 mechanically coupled to the armature 112 through a spring 116. The flange stop 106 has a first end 106a which is the fuel inlet connection point and a second end 106b received by the first bore 101a of the doser valve housing 101 and the through hole 111, with a portion of the flange stop 106 being adjacent to the bobbin 109 and another portion of the flange stop 106 being adjacent to the armature 112 and receiving the spring 106. The flange stop 106 also includes a through passageway 118 which receives fuel from a pressurized source at end 106a (not shown).

The armature 112 is shaped such that is it defines an open ended bore 112a in fluid communication with the passageway 118 and may receive an end of the poppet 114 and the spring 116. The armature 112 is preferably formed of a ferromagnetic material and functions as a moving part of the solenoid assembly 102. The armature 112, is subject to flux generated by one or more coils 108 of conductive material wrapped around a tubular bobbin 109 and electrically coupled to an electrical energy source 110. The armature 112 is actuated when the one or more coils 108 are energized by the electrical energy source 110. The movement of the armature 112 is guided within the through hole 111. The linear movement of the armature 112 is limited by the placement of the stop 106 and an inside wall 101c of the first bore 101a of the doser valve housing 101. The distance in which the armature 112 can travel between the stop 106 and the inside wall 101c of the first bore 101a of the doser valve housing 101 is the poppet stroke distance. The placement of the stop 106 may be adjusted at the time of manufacturing and the poppet stroke distance is then set to meet a desired flow.

A poppet 114 is attached to the armature 112, which is actuated by electrically energizing the coil 108 wrapped around the bobbin 109 of the solenoid assembly 102. The poppet 114 has a stem passageway 114e to communicate fuel from the first bore 101a of the housing 101 to the second bore 101b of the housing 101 and includes a first end 114a with shoulders 114f received within the open ended bore 112a of the armature 112 in the first bore 101a of the housing, a second end 114b with a conical shape 114c located within the second bore 101b of the housing, and a stem 114d separating the first 114a and the second ends 114b. Along the stem 114d of the poppet is an outlet passage(s) 117 allowing fluid communication between the second bore 101b and the stem passageway 114e within the poppet and the open ended bore 112a of the armature 112 in fluid communication with through passageway 118 in the stop 106. The stem passageway 114e in the poppet extends from the poppet inlet (not shown) to an outlet 117 located in the second bore 101b of the doser valve housing 101. The conical shape 114c at the second end of the poppet is preferably cone or spherical shaped and abuts the seat 115 when the at least one coil and tubular bobbin of the solenoid assembly 102 is not energized.

Because the poppet 114 has shoulders on the armature 112, the poppet 114 will move with the armature 112 when the armature 112 is actuated by the coil wrapped around the bobbin of the solenoid assembly 102. When the armature 112 is actuated by the solenoid assembly 102, the poppet 114 moves with the armature 112, such that the conical shaped end 114c lifts off of the seat 115. When the conical end 114c is lifted off of the seat 115, a seal between the conical shaped end 114c and the seat 115 is broken and fuel exits the doser valve 100 through exit passage 126.

Figure 4:
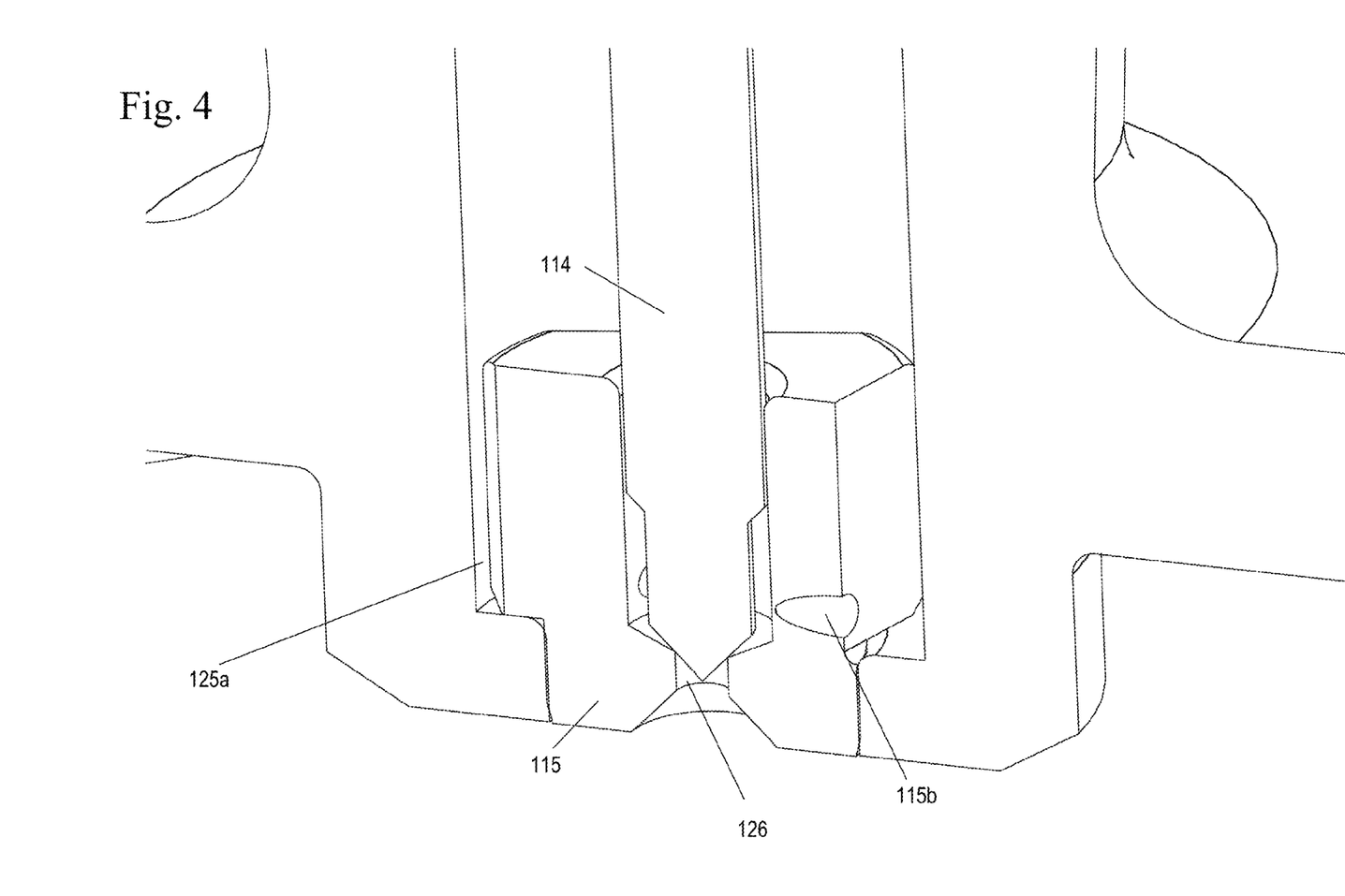
FIG. 4 shows an alternate view of the seat of the doser valve of the present invention.
Figure 7A:
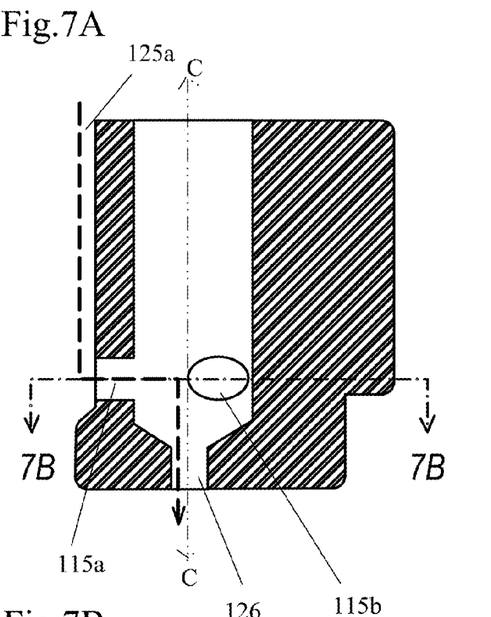
FIG. 7A shows a section of a doser valve seat of the present invention.
Figure 7B:
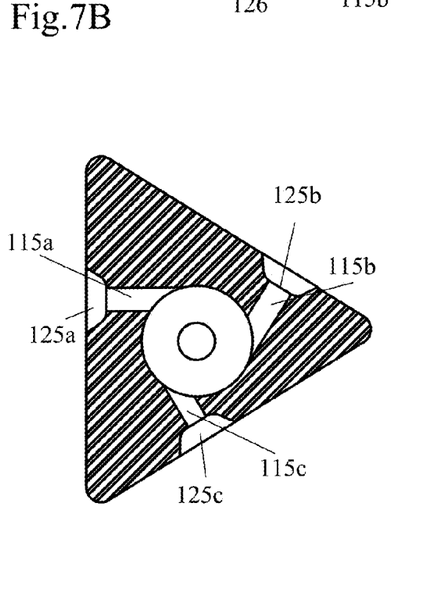
FIG. 7B shows a cross-section of the doser valve seat of the FIG. 7A.

The seat 115 is supported within the second bore 101b of the doser valve housing 101. The seat 115 is preferably triangular in shape and has axially slots 125a, 125b, 125c located or formed from an outer surface of the seat 115. The seat 115 also has at least one radial/tangentially extending passage 115a, 115b, 115c relative to a central axis C-C through the exit passage 126 in fluid communication with and extending from the axial slots 125a, 125b, 125c as shown in FIGS. 4, 7A, and 7B to allow fluid to flow axially through the axial slots 125a, 125b, 125c and then through the radial/tangential passages 115a, 115b, 115c and out of the exit passage 126 of the doser valve 100. The flow of fluid in the prior art doser valve seat and the doser valve seat of the present invention is shown by the dashed line in FIGS. 6A and 7A. By having a radial/tangentially passage 115a, 115b, 115c per axial slot 125a, 125b, 125c within the seat 115, the fluid flow attains rotational momentum or "spin" which provides for proper fluid atomization. The rotational momentum may also be attained by adding spiral flutes, vanes or other similar passages to the seat 115.

In the prior art doser valve, as shown in FIGS. 6A and 6B, the flow passages through the prior art seat 15 configuration includes drilled holes 25a, 25b, 25c, 15a, 15b, 15c only. By providing axial milled slots 125a, 125b, 125c in fluid communication with radial/tangential drilled passages 115a, 115b, 115c in the present invention, the pressure drop through the seat 115 is minimized as compared to the prior art seat.

Fuel inlet connection point 106a receives fuel from a pressurized source (not shown). From the fuel inlet connection point 106a, the fuel moves into the through passageway 118 of the flange stop 106 and into the open ended bore 112a of the armature 112. From the bore 112a of the armature 112, fluid flows into the stem passageway 114e of the poppet 114 and out the outlet passage(s) 117 of the poppet 114 into the second bore 101b of the doser valve housing 101.

When the solenoid assembly 102 is energized, the armature 112 overcomes the force of the spring 116 and moves towards the stop 106, until the armature 112 comes into contact with stop 106. The movement of the armature 112 moves the poppet such that the conical shaped end 114c of the poppet 114 lifts off of the seat 115. When the conical shaped end 114c lifts off of the seat 115, a seal between the conical end 114c and seat 115 is broken and the fuel exits from the second bore 101b of the housing through axial slots 125a, 125b, 125c through a radial/tangentially passages 115a, 115b, 115c and out through the seat 115. The fluid exiting the seat is forced out of the doser valve 100 over the conical end 114c so that a metered quantity of fuel is delivered to the engine. Furthermore, by providing large axially slots 125a 125b, 125c in the seat 115 of the present invention, the pressure drop and the flow variation present in prior art seats is minimized.

When the solenoid assembly 102 is de-energized, the biasing force of the spring 116 returns the armature 112 to its original position. Because the poppet 114 has shoulders 114f adjacent to the armature 112 and one end of spring 116, the head 114c of the poppet 114 returns to the seat 115 and seals, preventing fuel from exiting the doser valve 100.

Figure 8A:
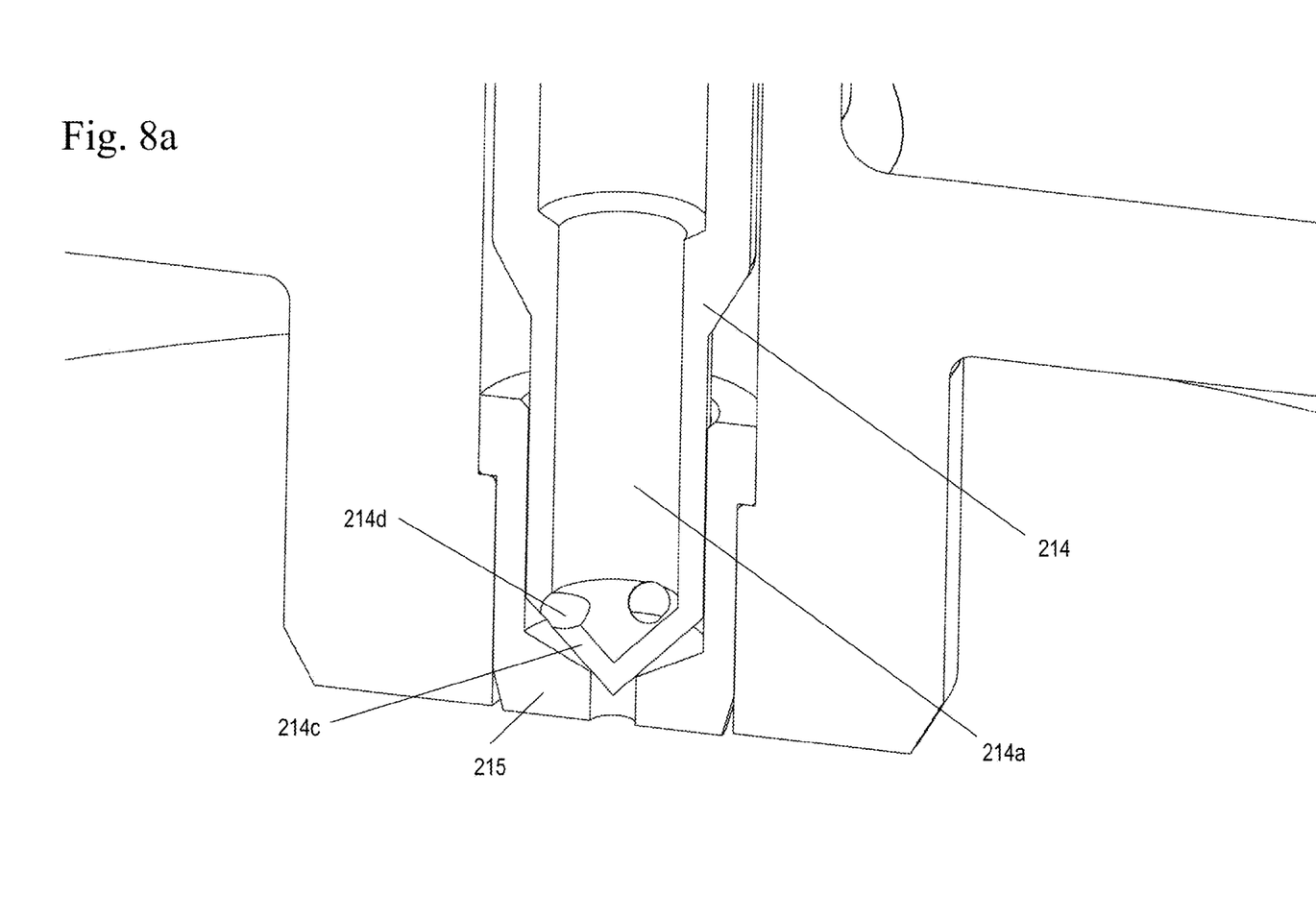
FIG. 8A shows cross-section of an alternate seat and poppet design.
Figure 8B:
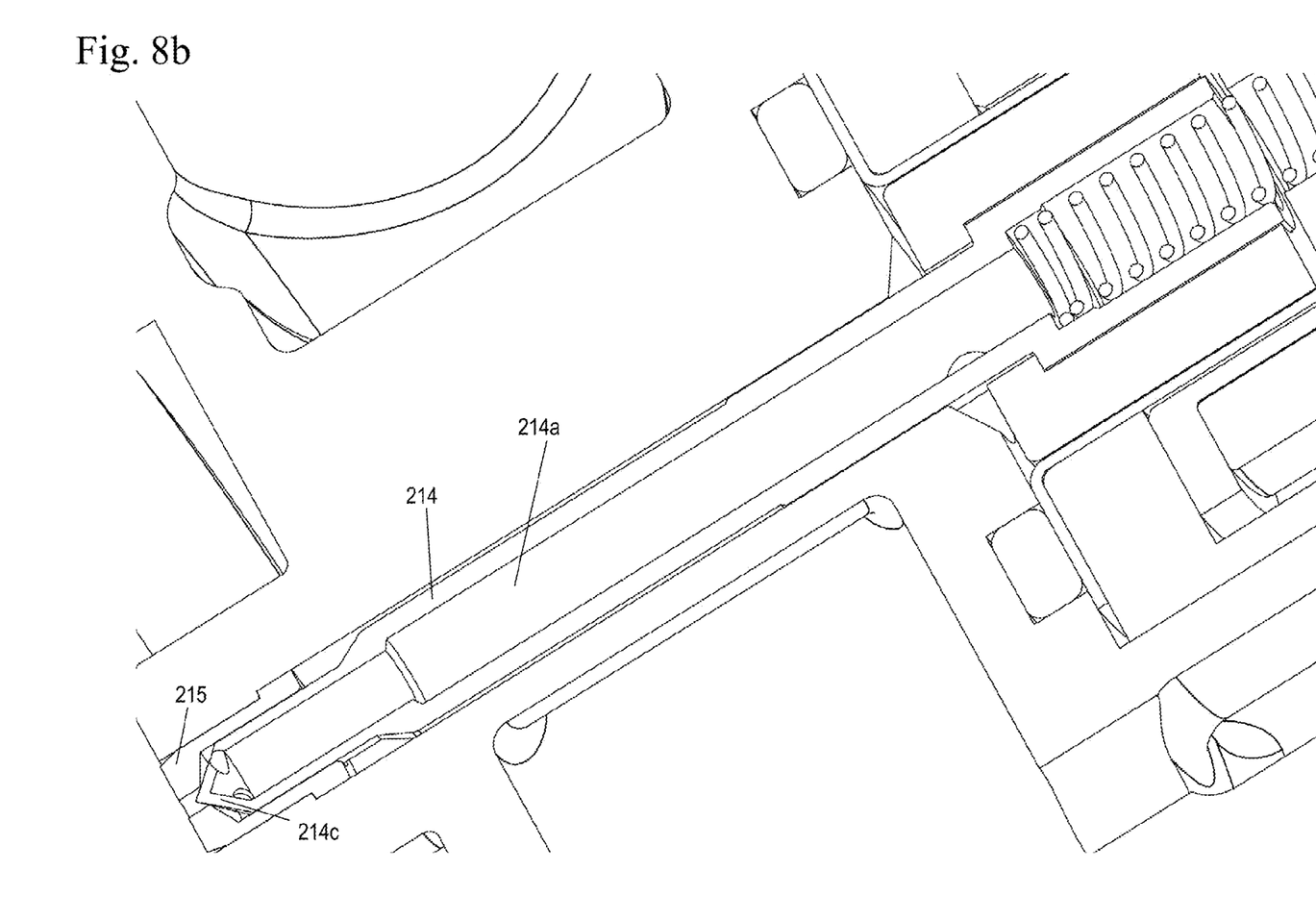
FIG. 8B shows another cross-section of an alternate seat and poppet design.

Alternatively, as shown in FIGS. 8A and 8B, poppet 114 and seat 115 would be replaced by poppet 214 and seat 215. The poppet 214 has one or more angled drilled passages 214d at end 214c exiting the poppet 214 and all of the fuel would flow through and exit out of the conical end 214c of the poppet valve 214 and into cavity at seat 215 and exits out passageway in seat 215. The poppet 214 has a stem passageway 214a which extends the entire length of the poppet through the conical end.

When the solenoid assembly 102 is de-energized, the conical end 214c of the poppet valve 214 would seal with the seat 215 and fluid is blocked from exiting the valve.

When the solenoid assembly 102 is energized, the armature 112 overcomes the force of the spring 116 and moves towards the stop 106, until the armature comes into contact with the stop 106. The movement of the armature 112 moves the poppet such that the conical shaped end 214c of the poppet lifts off of the seat, and fuel exits through stem passageway 214a through the angled drilled passages of the poppet conical end out seat passage 215 so that a metered quantity of fuel is delivered to the engine.

Figure 9A:
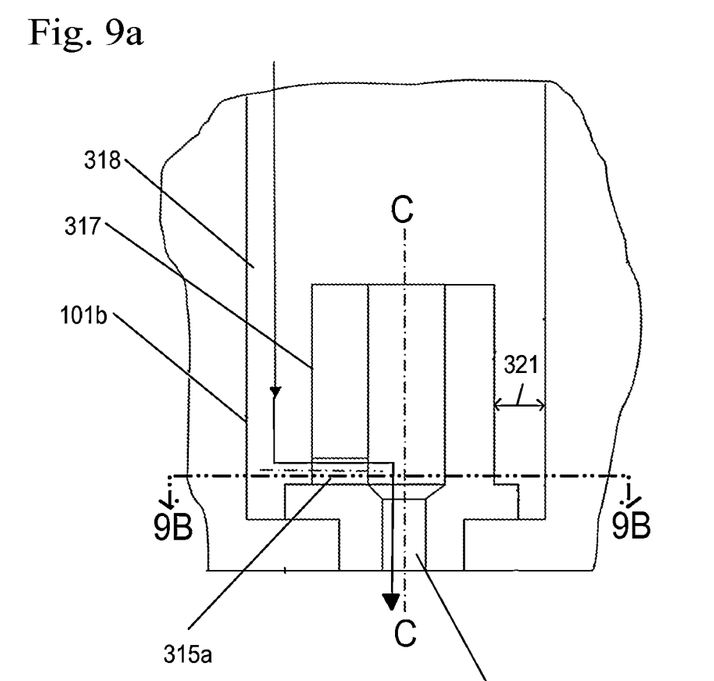
FIG. 9A shows a section of another alternate seat of the present invention.
Figure 9B:
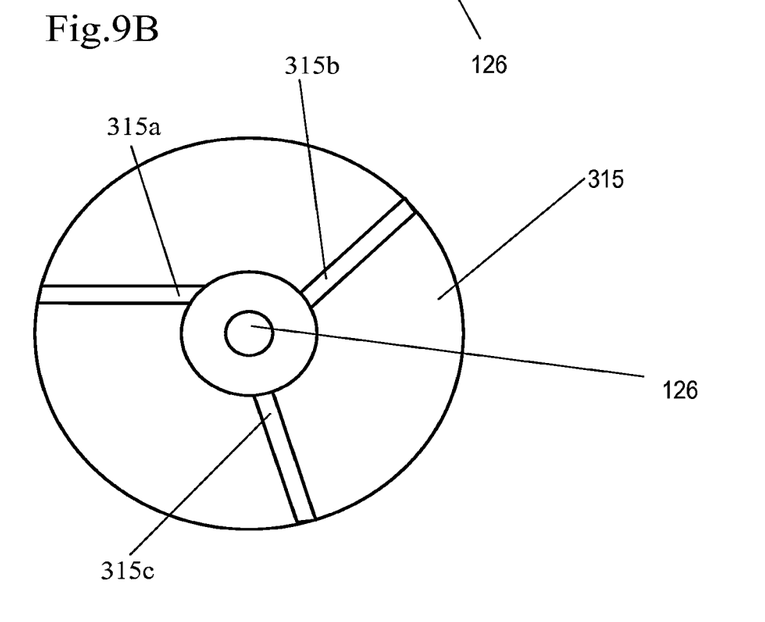
FIG. 9B shows a cross-section of the alternate seat of the present invention.
Figure 10:
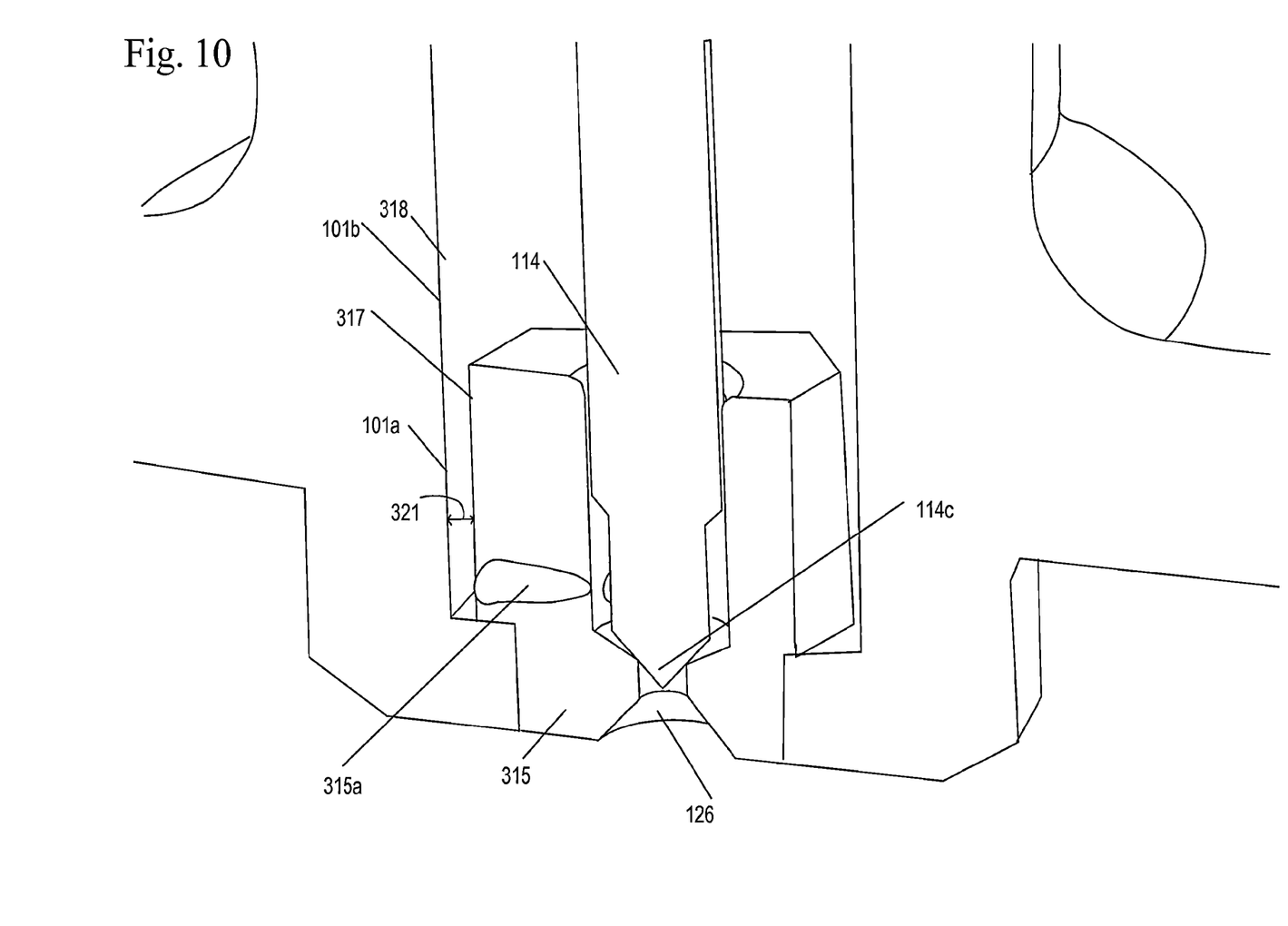
FIG. 10 shows an alternate view of the seat of the doser valve of the present invention shown in FIGS. 9A and 9B.

In another embodiment shown in FIGS. 9A, 9B, and 10, seat 115 would be replaced with seat 315. The outer diameter 317 of seat 315 is less than the inner diameter 318 of the second bore 101b of the housing, such that fluid flows from stem passageway 114e in the poppet and out the outlet (not shown) located in the second bore 101b of the doser valve housing 101 into a passage 321 defined between the outer diameter 317 of the seat 315 and the inner diameter 318 of the second bore 101b. From radial passage 321, fluid flows into at least one radial/tangentially extending passage 315a, 315b, 315c relative to a central axis C-C and through the exit passage 126. Additional coaxial or axial slots are necessary to move fluid to the radial/tangential passage 315a, 315b, 315c from the second bore 101b of the housing 100. By having a radial/tangentially passage 315a, 315b, 315c within the seat 315, the fluid flow attains rotational momentum or "spin" which provides for proper fluid atomization. The rotational momentum may also be attained by adding spiral flutes, vanes or other similar passages to the seat 315.

When the solenoid assembly 102 is de-energized, the conical end 114c of the poppet valve 114 would seal with the seat 315 and fluid is blocked from exiting the valve.

When the solenoid assembly 102 is energized, the armature 112 overcomes the force of the spring 116 and moves towards the stop 106, until the armature comes into contact with the stop 106. The movement of the armature 112 moves the poppet such that the conical shaped end 114c of the poppet lifts off of the seat 315, and fuel exits through passage 321 through the radial/tangentially passage 315a, 315b, 315c and out seat so that a metered quantity of fuel is delivered to the engine.

After the doser valve 100 of the above embodiment is manufactured, but prior to the stop 106 being permanently fixed in place relative to the solenoid assembly 102, the doser valve 101 is subjected to fluid pressure and the flow rate is monitored. The stop 106 is pressed toward the armature 112 and once the appropriate flow rate is reached, the stop 106 is fixed in place relative to the doser valve housing 101 by crimping, welding, or other means. The doser valve 100 is then retested to verify that the flow rate is as desired. The welds, crimping, or means of fastening are preferably present between the tubular casing 113 and the doser valve housing 101 and the tubular casing 113 and the stop 106.

In comparison to the prior art, this method of manufacturing compensates for various production tolerance that might otherwise change the flow rate for a valve with a predetermined stroke. Therefore, instead of setting the stroke to a theoretically approved dimension, the stroke is set under actual test conditions to achieve a monitored flow.

Furthermore, the seat 115, 215, 315 of the poppet valve 114 is pressed into the second bore 101b of the housing as shown in FIGS. 7A-7B, rather than brazed as in the prior art doser valves as shown in FIGS. 6A-6B. One of the problems associated with brazing the seat into the doser valves of the prior art is the migration of braze material into the small flow passages of the housing, impeding the flow of fuel out of the doser valve and discouraging the proper atomization of fuel. By press fitting the seat 115, 215, 315 into the doser valve housing, the braze material and problems associated with it are eliminated.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of setting the flow rate of a doser valve comprising:
   a) providing a doser valve comprising:
      a valve housing defining a first bore graduating to a second bore, and a passage through the housing surrounding the second bore having an inlet and an outlet;
      a solenoid assembly received within the first bore, comprising a tubular bobbin, at least one coil wrapped around the tubular bobbin and coupled to an energy source, and;
      an armature received within the tubular bobbin and moveable a distance along an axis of the tubular bobbin;
      a stop received within the first bore and the tubular bobbin, the stop being movable within the tubular bobbin to determine the distance which the armature moves along the axis of the tubular bobbin;
      a poppet valve comprising a stem with a first end and a second end, and a stem passageway extending from the first end to the second end, the first end of the stem having an inlet and received by the armature in the first bore of the housing and the second end of the stem received by the second bore of the housing and having an outlet;
      a seat receiving the second end of the poppet valve in the second bore of the housing; and
      a spring biasing the armature and the poppet valve toward the seat;
   b) monitoring a flow rate through the doser valve;
   c) comparing the monitored flow rate to a predetermined flow rate, and
   d) altering a position of the stop relative to the armature in the valve housing, to alter a distance in which the armature is moveable within the first bore of the valve housing and an amount of lift of the poppet valve relative to the seat, until the flow rate through the seat of the doser valve is altered to correspond to the predetermined flow rate; and
   e) fixing the stop in place relative to the armature and valve housing.

2. The method of claim 1, wherein the seat further comprises at least one radial/tangential extending passage relative to a central axis of an exit passage out of the seat and in fluid communication with the second bore of the housing and the exit passage out of the seat.

3. The method of claim 2, wherein the seat further comprises at least one axially located slot from an outer surface of the seat between the at least one radial/tangential extending passage and the second bore of the housing and in fluid communication with the at least one radial/tangential extending passage and the second bore of the housing.

4. The method of claim 2, further comprising a radial passage is defined between the inner diameter of the second bore and the outer diameter of the seat and the radial passage is in fluid communication with the second bore of the housing and the at least one radial/tangential extending passage.

* * * * *